(12) United States Patent
Zhou (10) Patent No.: US 8,707,187 B2
(45) Date of Patent: Apr. 22, 2014

(54) CONCURRENT DOCUMENT MARKUP

(75) Inventor: Jerry J. Zhou, Mission Viejo, CA (US)

(73) Assignee: Siemens Products Product Lifecycle Management Software Inc., Plano, TX (US)

( * ) Notice: Subject to any disclaimer, the term of this patent is extended or adjusted under 35 U.S.C. 154(b) by 435 days.

(21) Appl. No.: 12/883,779

(22) Filed: Sep. 16, 2010

(65) Prior Publication Data

US 2012/0072854 A1   Mar. 22, 2012

(51) Int. Cl.
  *G06F 3/00*  (2006.01)
  *G06F 17/00* (2006.01)
  *G06F 7/00*  (2006.01)

(52) U.S. Cl.
  USPC ........... 715/751; 715/229; 715/230; 707/608; 707/704

(58) Field of Classification Search
  USPC ................. 715/751, 230, 229, 231, 232, 233; 707/608, 704
  See application file for complete search history.

(56) References Cited

U.S. PATENT DOCUMENTS

| | | | |
|---|---|---|---|
| 6,014,677 A | 1/2000 | Hayashi et al. | |
| 6,314,439 B1 | 11/2001 | Bates et al. | |
| 6,389,420 B1 * | 5/2002 | Vahalia et al. | 1/1 |
| 6,438,566 B1 | 8/2002 | Okuno et al. | |
| 6,910,040 B2 | 6/2005 | Emmick et al. | |
| 6,917,942 B1 * | 7/2005 | Burns et al. | 1/1 |
| 7,194,679 B1 * | 3/2007 | Green | 715/233 |
| 7,448,077 B2 * | 11/2008 | Curran et al. | 726/12 |
| 7,539,678 B2 * | 5/2009 | Demsey et al. | 1/1 |
| 7,698,379 B2 * | 4/2010 | Dutta et al. | 709/217 |
| 7,818,678 B2 * | 10/2010 | Massand | 715/751 |
| 7,822,719 B1 * | 10/2010 | Noveck | 707/687 |
| 7,941,399 B2 * | 5/2011 | Bailor et al. | 707/608 |
| 8,006,223 B2 | 8/2011 | Boulineau et al. | |
| 8,028,275 B2 | 9/2011 | Eldridge et al. | |
| 8,086,960 B1 * | 12/2011 | Gopalakrishna et al. | 715/266 |
| 8,095,868 B2 * | 1/2012 | Kawabuchi et al. | 715/229 |
| 2003/0004771 A1 * | 1/2003 | Yaung | 705/8 |
| 2004/0163042 A1 * | 8/2004 | Altman | 715/512 |
| 2006/0026502 A1 | 2/2006 | Dutta | |
| 2006/0161838 A1 * | 7/2006 | Nydam et al. | 715/512 |
| 2006/0282762 A1 * | 12/2006 | Diamond et al. | 715/511 |
| 2007/0244906 A1 * | 10/2007 | Colton et al. | 707/10 |
| 2008/0028301 A1 * | 1/2008 | Look et al. | 715/255 |
| 2008/0270406 A1 * | 10/2008 | Flavin et al. | 707/8 |
| 2010/0031135 A1 * | 2/2010 | Naghshin et al. | 715/230 |
| 2010/0122154 A1 * | 5/2010 | Howell et al. | 715/233 |
| 2010/0318502 A1 * | 12/2010 | McKenney | 707/696 |
| 2011/0154180 A1 * | 6/2011 | Evanitsky et al. | 715/233 |

* cited by examiner

*Primary Examiner* — Nicholas Ulrich (57) ABSTRACT

A system, method, and computer readable medium are presented for concurrent markup of a document by a plurality of reviewers. A method includes combining a document and markups associated with a plurality of reviewers into a reviewing file for use by a user. Markups associated with the user are locked and a markup associated with the reviewer is updated. Then the markups associated with the user are unlocked. Updating the markup includes receiving a revised reviewing file that includes a change to the markup, extracting the change to the markup from the revised reviewing file, and saving the changed markup separate from the document.

21 Claims, 6 Drawing Sheets

CONCURRENT DOCUMENT MARKUP

TECHNICAL FIELD

The present disclosure is directed, in general, to systems and methods for use in document management.

BACKGROUND OF THE DISCLOSURE

Many documents are developed by a collaborative process in which a document is created, reviewed, commented upon, and revised. The process may be iterative, passing through several repetitions of the review/comment/revise cycle before the document is considered complete. Several individuals may review and comment upon the document before the document is revised responsive to the aggregate comments from all reviewers. Improved systems for document management during this process are desirable.

SUMMARY OF THE DISCLOSURE

Various embodiments include a data processing system, method, and computer readable medium. A method for concurrent markup of a document by a plurality of reviewers includes combining a document and markups associated with a plurality of reviewers into a reviewing file for use by a user. The method also includes locking markups associated with the user and updating a markup associated with the user. The method further includes unlocking the markups associated with the user. Updating the markup associated with the user includes receiving a revised reviewing file that includes a change to the markup, extracting the change to the markup from the revised reviewing file, and saving the changed markup separate from the document.

Some embodiments include a method performed by one or more data processing systems for concurrent markup of a document by a plurality of reviewers. This method includes combining a document and markups associated with a plurality of reviewers into a reviewing file for use by a first user. The method includes locking a first lock, the first lock associated with a first plurality of markups, the first plurality of markups associated with the first user. The first lock is locked by the first user and, while locked, prevents a user other than the first user from writing to, the first plurality of markups. The method includes, while the first lock is locked, updating a first markup associated with the first user; and unlocking the first lock. Updating a first markup associated with the first user includes receiving a revised reviewing file including a change to the first markup, extracting the change to the first markup from the revised reviewing file, and saving the changed first markup separate from the document.

In some cases, the method includes locking a second lock, the second lock associated with the document and with a second plurality of markups, the second plurality of markups associated with all reviewers. The second lock is locked by a second user and, while locked, prevents a user other than the second user from writing to the document or the second plurality of markups. This method includes, while the second lock is locked, updating the document in the data processing system, and unlocking in the data processing system the second lock. Updating the document includes receiving a revised reviewing file including a change to the document and a change to a second markup, extracting all markups from the revised reviewing file to generate a comment-free revised document, saving the changed second markup in the data processing system separate from the comment-free revised document, and saving the comment-free revised document in separate from the changed second markup. The steps of locking a first lock, updating a markup, and unlocking the first lock are performed only when the second lock is unlocked, and the steps of locking a second lock, updating the document, and unlocking the second lock are performed only when the first lock is unlocked.

Other embodiments include other features, and include data processing systems particularly configured to perform certain processes as described herein, and include computer-readable storage mediums encoded with computer-executable instructions that, when executed, cause a data processing system to perform processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Where two or more reviewers wish to review a single document, they may each take a separate copy of the document and independently mark up the copy with their notes. In such a system, however, no reviewer can see another reviewer's markups and an author of the document may be forced to manually incorporate each reviewer's comments into a master copy of the document. Such a practice may be time-consuming and error-prone.

A document management system may allow the reviewers to sequentially check out the master document and add their individual comments, before checking the annotated document back into the system for checkout by another reviewer. However, such a system prevents two reviewers from reviewing the document at the same time, which may lengthen the review process. In other systems, a collaboration session may be opened, in which each reviewer enters markups and observes other reviewers entering markups in real time. However, such a system forces reviewing to occur in a live (if distributed) meeting and may be impractical or inconvenient when reviewers are located in different time zones.

Difficulties may arise in an automated system for incorporating markups from different copies of a document, because some programs providing markup functionality insert invisible "anchor" characters in the document at locations to which comments refer. As such, copies of a document marked up by different reviewers will have anchor characters inserted in different places, resulting in differences in the character streams of different reviewers' copies of the document and creating difficulties in determining where in a first reviewer's copy of the document the anchor characters corresponding to comments entered by a second reviewer should be placed.

When an author revises a document based upon reviewers' comments, some comments will be deleted, as having been incorporated into the document or being no longer relevant. Other comments, however, will remain attached to the document. An automated system for placing anchor characters in the revised document for the remaining comments may encounter difficulties where the former location of the anchor character has changed due to the author's addition or deletion of text in earlier portions of the document. Similar difficulties may arise when an author belatedly receives a reviewer's markups to a previous version of the document after generating a new version.

In other systems, markups are tied to individual words in the document, rather than to anchor characters. In such systems, the document may be freely revised without updating the markup data. However, ambiguity regarding the location of a comment may be introduced when the same word appears in the document in different locations. Furthermore, in revising the document, an author may remove or replace the word, thereby removing the anchor for the comment.

Figure 1:
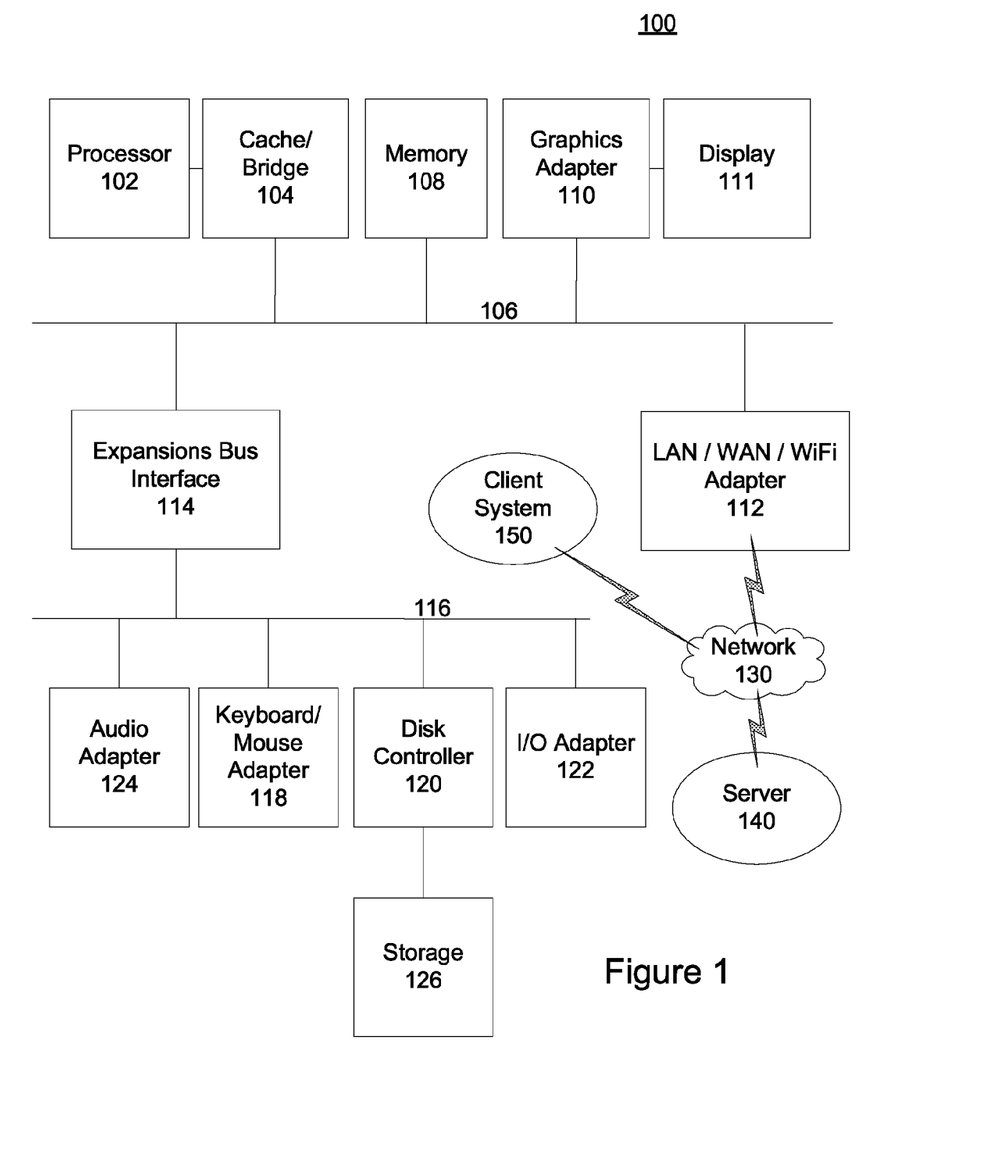
FIG. 1 depicts a block diagram of a data processing system in which an embodiment can be implemented.

FIG. 1 depicts a block diagram of a data processing system 100 in which an embodiment can be implemented, for example as a document management system configured to perform processes as described herein. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 116 in the example shown is an audio adapter 124, to which speakers (not shown) may be connected for playing sounds. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft® Windows® (a product of Microsoft Corporation, located in Redmond, Wash.) may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100. The data processing system 100 can communicate over the network 130 with a client system 150, which is also not part of the data processing system 100, but can be implemented, for example, as a separate data processing system 100.

Figure 2:
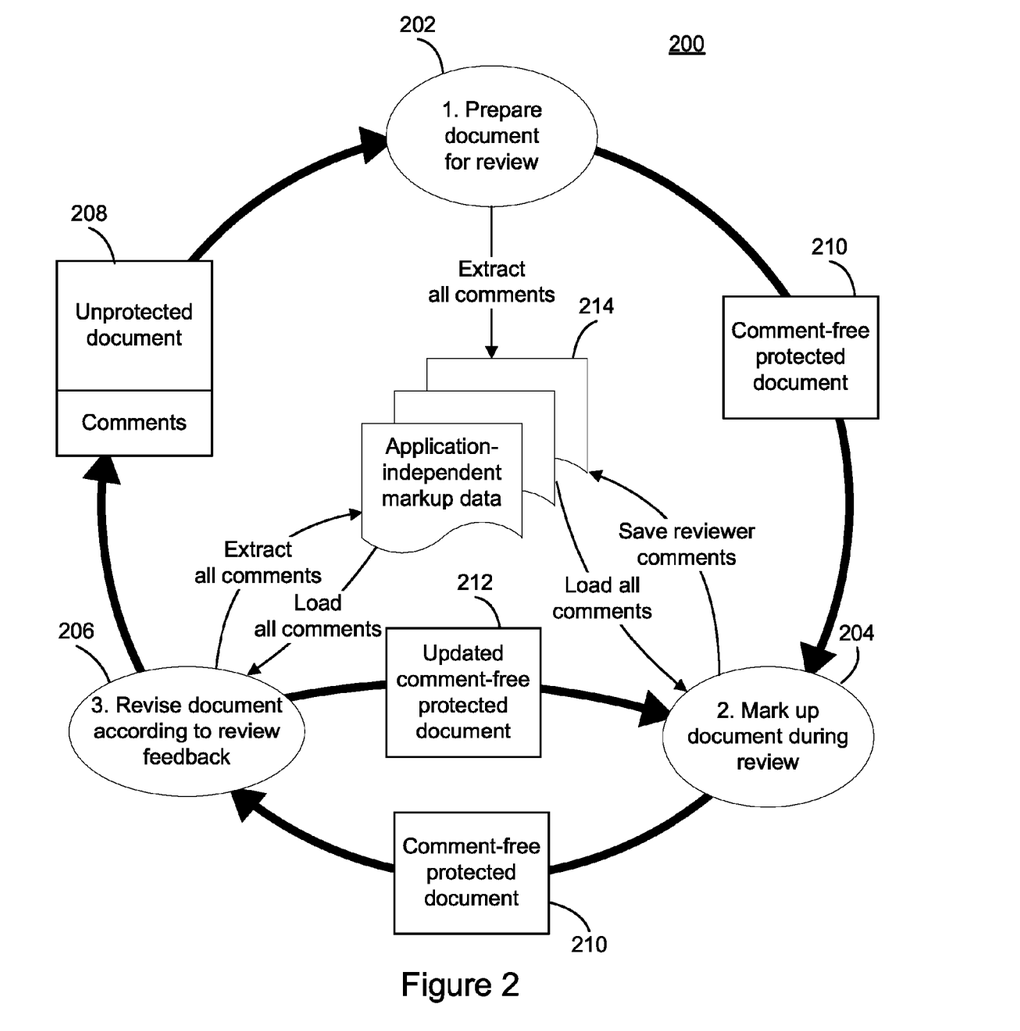
FIG. 2 depicts a diagram of information, activity, and data flow of a concurrent markup system according to the disclosure.

The data processing system 100 may be modified to operate as part of a document management system and configured to perform processes as described herein. The data processing system 100 may provide a system for concurrent review of documents, as depicted in FIG. 2. In providing such service, the data processing system 100 may operate in the role of a client system or server system. In some embodiments, a user at the client system 150 uses the data processing system 100 to perform processes as described herein for concurrent markup of documents maintained in a document management system provided by the server 140. In other embodiments, the data processing system 100 provides both concurrent markup processes and document management services to the user of the client system 150. In still other embodiments, the data processing system 100 provides one or both of concurrent markup services and document management services to a user of the data processing system 100.

FIG. 2 depicts a diagram of information, activity, and data flow 200 of a concurrent markup system according to the disclosure. Three activities are supported by the concurrent markup system. First, in preparation activity 202, a document may be prepared for review. Second, in reviewing activity 204, one or more reviewers review the document and enter markups on the document. Third, in revision activity 206, an author of the document revises the document according to comments entered by the reviewers. The terms markup and comment are used interchangeably in this disclosure.

There may be three types of users of a concurrent markup system according to the disclosure. Authors of a document create and revise the document and are permitted to perform the preparations activity 202, the reviewing activity 204, and the revision activity 206. Reviewers of the document (which includes the authors) review the document and are only permitted to perform the reviewing activity 204. Readers of the document are only allowed to read the document and markups entered by the reviewers. Readers may be considered to perform a restricted version of the reviewing activity 204, without the ability to enter and store markups of the document.

During the preparation activity 202, an author may receive a first draft of a document, without any associated markups. In this scenario, the preparation activity merely provides a comment-free, write-protected document 210 for use by reviewers in the reviewing activity 204. The document 210 may be provided directly to the reviewers, for example, as an attachment to an email. However, typically the document is made available in a document management system, database, or file storage facility that is shared by all authors and reviewers, with reviewers limited to read-only access to the document.

In a second preparation scenario, the preparation activity 202 receives a file 208 in a storage format that includes both a document for review and one or more comments of one or more reviewers. Such a file may be the result of previous reviewing activity performed on the document using commercial programs such as Adobe@ Acrobat@ (a product of Adobe Systems Incorporated located in San Jose, Calif.) or Microsoft® Word® (a product of Microsoft Corporation, located in Redmond, Wash.). Such a file may also be generated by the revision activity 206, as described in greater detail below. In this second preparation scenario, the author extracts from the file 208 all comments or markups for each reviewer and stores the markup data in an application-independent format in a markup store 214. By methods to be discussed below with reference to FIGS. 4A and 4B, the markups associated with each reviewer are grouped together. The comment-free document is then provided to the reviewing activity 204 as discussed above.

A reviewer may perform the reviewing activity 204 on a plurality of occasions. Multiple reviewers may be performing the reviewing activity 204 at the same time. During the reviewing activity 204 a reviewer is able to view the document and markups entered by herself and by all other reviewers, pursuant to rules of permission and/or scope, as described below. When a reviewer initiates the reviewing activity 204, all reviewer markups are loaded from the markup store 214 and a commented version of the document 210 is generated for reviewing and markup by the reviewer. For the duration of the reviewing activity 204, the reviewer may show or hide individual markups or all markups entered by herself or another reviewer. The reviewer may add, edit, and delete only her own markups. The reviewer may mark any of her markups as private, giving permission only for the reviewer to see the markup, not any author or other reviewer. The reviewer may limit the scope of visibility of a markup, allowing only a subset of authors and/or reviewers to see the markup. When the reviewer has completed her review, she terminates the reviewing activity 204, which extracts her current markups from the commented version of the document 210 and stores them in the markup store 214.

During the revision activity 206, an author is able to view the document and markups entered by all reviewers. When an author initiates the revision activity 206, all reviewer markups are loaded from the markup store 214 and a commented version of the document 210 is generated for revision by the author. The author may show or hide individual markups or all markups entered by any individual reviewer. The author may edit the document and may modify or delete any markup by any reviewer. When the author has completed revising the document, he terminates the revision activity 206, which extracts from the commented document the current markups for all reviewers and saves the markups in the markup store 214. Once all markups have been extracted from the commented document, the revision activity 206 provides an updated, comment-free, protected document 212 to the reviewing activity 204. As described with reference to the preparation activity 202, the revision activity 206 may provide the document 212 either directly or through read-only access in a shared storage facility available to the reviewing activity 204.

In other circumstances, the author may want to archive, print or export the commented version of the document. In such scenarios, the revision activity 206 may generate the file 208, in a storage format that incorporates both the document and the comments of some or all reviewers.

A concurrent markup system according to some embodiments of the disclosure does not permit the reviewing activity 204 to be performed concurrently with the revision activity 206. In such embodiments, if reviewers are reviewing a document, an author must wait to perform the revision activity 206, although the author is permitted to view the document and current markups. Similarly, if an author is revising the document, reviewers must wait to perform the reviewing activity, although reviewers are permitted to view the document and current markups.

As will be described in more detail with reference to subsequent figures, when a reviewer initiates the reviewing activity 204, the markups in the markup store 214 that are associated with the reviewer are locked. A lock is a technique used in data processing systems having multiple concurrent users to provide synchronization between users for access to a resource of the data processing system—in this case, the file or other storage space where the markups of an individual reviewer are stored. When one user has locked the resource, another user may have only limited access to the resource. In a concurrent markup system according to the disclosure, when a reviewer locks her markups, an author is limited to read-only access to the reviewer's markups and is not permitted to initiate the revision activity 206.

Conversely, when an author initiates the revision activity 206, the document in a shared storage facility and the markups in the markup store 214 associated with all reviewers are locked. When the document and the markups are locked, reviewers and other authors are limited to read-only access to the document and the markups and reviewers are not permitted to initiate the reviewing activity 204.

Typically, a lock is implemented as a binary value that is stored in a location in memory (often called a "flag") that is available to all users of the system. The lock may be considered "locked" when a first binary value is stored in the flag and "unlocked" when a second binary value is stored in the flag.

Figure 3A:
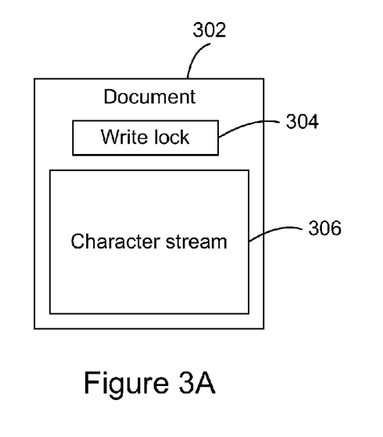
FIGS. 3A and 3B depict document storage formats according to the disclosure.
Figure 3B:
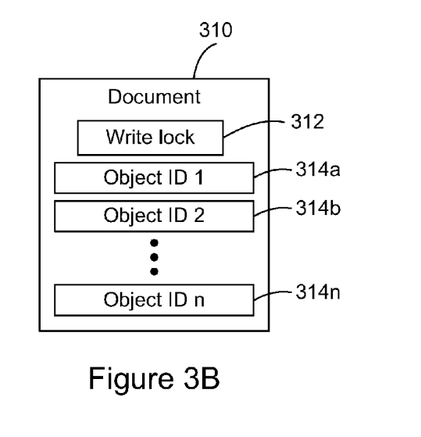

FIGS. 3A and 3B depict document storage formats 302 and 310, respectively, according to the disclosure. In the format 302, the content of a document is stored as a single character stream 306. Associated with a document stored in the format 302 is a write lock 304. While the write lock 304 is depicted in FIG. 3A as located within the document stored in the format 302, it will be understood that the write lock 304 may be stored in another memory or storage location.

In the format 310, the content of a document comprises an ordered collection of object references 314a-314n to objects stored in a data processing system according to the disclosure. Each object in the system includes a character stream and is identified by an object ID. An object that includes several paragraphs may be organized as an ordered collection of character streams, each with an associated paragraph ID. When a document in the format 310 is opened, the document is dynamically generated by concatenating, in sequence, the character streams of the objects identified by the object references 314a-314n to form a single contiguous character stream.

The format 310 also includes a write lock 312, which may be stored within or separately from a document stored in the format 310. The write lock 312 is only for the document that contains the object references 314a-314n. Each object indicated by the object references 314a-314n has an individual write lock that is used by an author to lock the objects during the revision activity 206.

Figure 4A:
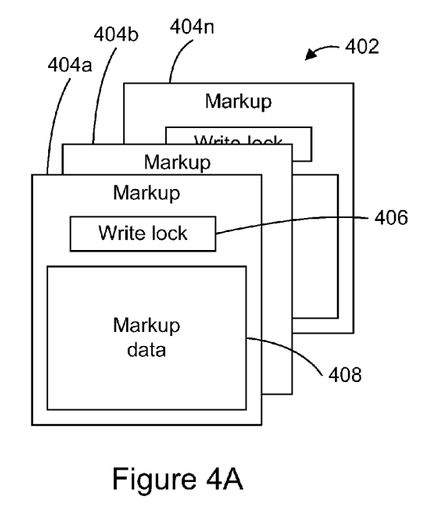
FIGS. 4A and 4B depict markup storage formats according to the disclosure.
Figure 4B:
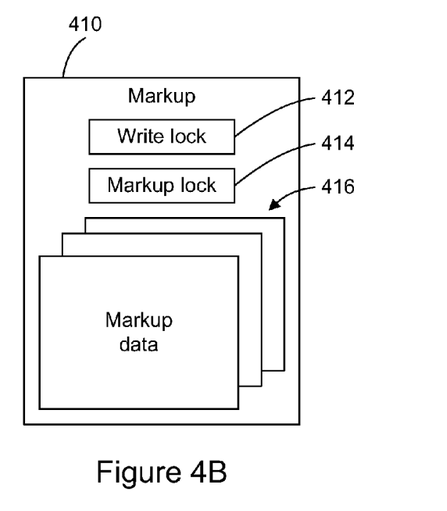

FIGS. 4A and 4B depict markup storage formats 402 and 410, respectively, according to the disclosure, for storing markups associated with a plurality of reviewers. In the format 402, the markups associated with each reviewer are stored in separate files 404a-404n. In each file 404, a plurality of markups associated with the reviewer is stored in markup data 408. Each file 404 also includes a write lock 406, which may be stored within or separately from the file 404. In some embodiments the write lock 406 for a file 404 may be provided by the data processing system. Individually, each write lock 406 is associated with a plurality of markups associated with an individual reviewer. Together, the write locks 406 of the files 404a-404n collectively provide a lock associated with the plurality of markups associated with all reviewers.

In the format 410, the markup data 416 for all reviewers may be stored in a single file or other storage structure. A single write lock 412 is provided for the file, and may be stored within or separately from the file. The write lock 412 provides a lock associated with the plurality of markups associated with all reviewers. A markup lock 414 is also provided in the format 410. As will be described in greater detail with reference to FIGS. 5 and 6, the markup lock 414 is locked when any reviewer is performing the reviewing activity 204 and the write lock is locked when an author is performing the revision activity 206. Using markup storage format 402 or 410 another suitable storage format, a concurrent markup system according to the present disclosure provides storage for markups associated with a plurality of reviewers.

Each markup saved in the markup data 408 or the markup data 416 includes a reviewer identifier and a date on which the markup was created or modified by the reviewer. The markup also includes a reference, which identifies a character in the document to which the markup refers. The markup may also include comment data, a highlight color, and a number of characters to highlight. Where the markup is a text comment, the comment data is a character stream. Where the markup is a highlighted section of the document, the comment data may be an empty stream. A markup may include other suitable descriptors of annotations a reviewer places on a document. A markup may include descriptors for a plurality of annotations, for example, a highlighted section of the document and comment text annotating the highlighted section.

The reference in a markup may have a format that is based upon the storage format of the document. Where the document is stored in the format 302, the markup reference may be an ordinal number (or position) of a character, where the characters in the character stream are numbered from the beginning of the character stream. Where the document is stored in the format 310, the markup reference may be an object ID (and, if appropriate, a paragraph ID) and an ordinal number of a character in the character stream of the object (or paragraph).

As may be seen, reviewer's markups of a document are stored separately from the associated document in a concurrent markup system according to the disclosure. The data processing system 100 may save markups using the format 402, the format 410, or other suitable format in the memory 108, on the server 140, or in other suitable storage. The data processing system 100 may save the document using the format 302, the format 310, or other suitable format in the memory 108, on the server 140, or in other suitable storage. The document may be saved in a document management system provided by the server 140 or by software executing on the data processing system 100.

In some embodiments, the document may be circulated to authors and reviewers directly for local storage by the users. In such embodiments, the document may be sent to users directly by email, CD, DVD, or other suitable distribution method, for use until the document is revised by an author and the revised version circulated to the reviewers and other authors.

Figure 5:
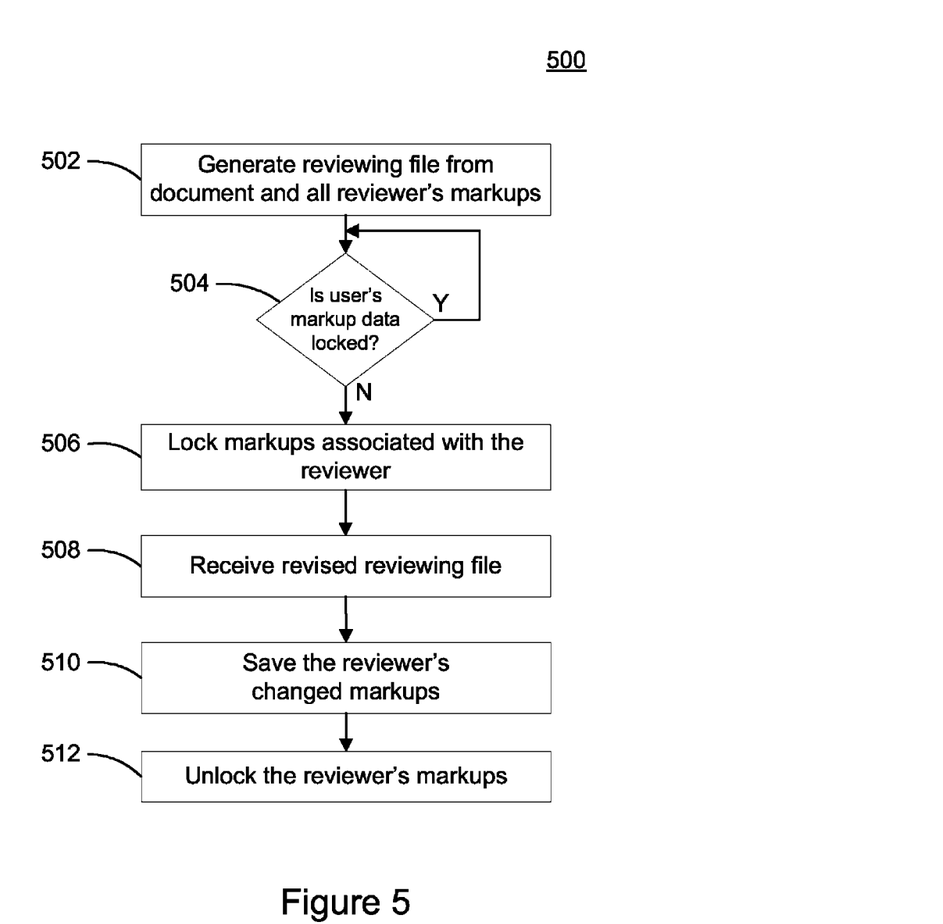
FIGS. 5-7 depict flow charts of methods according to the disclosure.

FIG. 5 depicts a method 500 of reviewing a document according to the disclosure. The method 500 provides one embodiment of the reviewing activity 204 described with reference to FIG. 2, as performed by the data processing system 100. In step 502, the data processing system 100 loads the markup data for all reviewers and generates a reviewing file by combining the comment-free, protected document 210 and the reviewers' markup data. The reviewing file may be sent to the user on the client system 150 or may be saved on the server 140 for the user to access. The markups may be displayed in the reviewing file as highlighted characters and/or callout boxes containing comment text, as appropriate, positioned in the character stream of the document as described by the markup data.

In step 504, the method 500 checks whether the markup data for the user (or reviewer) is locked. If the markup data is locked, it is an indication that the markup data cannot presently be modified and the method 500 loops, continuing to check the markup data lock until the markup data for the user is unlocked. The reviewer may use the marked up document in a read-only mode, or may terminate the reviewing activity 204 until a later time when the markup data is no longer locked. In this way, a user other than the user who locked the markup data lock is prevented from writing to the markup data associated with the user. Where the markup data is stored in the format 402, the reviewer's markups are considered locked if the write lock 406 is locked. Where the markup data is stored in the format 410, the reviewer's markups are considered locked if the write lock 412 is locked.

If the markup data for the user is not locked, in step 506, the method 500 locks the markup data associated with the reviewer performing this instantiation of the reviewing activity 204. In a concurrent markup system according to the disclosure, more than one reviewer may concurrently perform the reviewing activity 204. Where the markup data is stored in the format 402, each reviewer locks her markup data file 404 using the write lock 406. Where the markup data is stored in the format 410, each reviewer accesses the markup lock 414 to lock the shared markup file or storage structure. In some embodiments the markup lock 414 may comprise a plurality of bits, each bit associated with an individual reviewer, where the markup file is considered locked if any bit in the markup lock 414 is set. In other embodiments, the markup lock may be a counter that indicates how many reviewers are currently marking up the document, where the counter is incremented when a reviewer begins reviewing and is decremented when a reviewer is finished reviewing. In either embodiment, the markup lock 414 provides a plurality of locks, each associated with a single reviewer. It will be understood that in other embodiments, other suitable mechanisms for the markup lock 414 may be utilized.

The reviewer may add new markups, edit existing markups, and/or delete existing markups. When the reviewer has completed reviewing the document, she terminates the reviewing activity 204. In step 508, the revised reviewing file is received. In step 510, the method 500 extracts the reviewer's markups from the revised reviewing file and saves them in the markup store 214. Together, steps 508 and 510 perform a step of updating one or more markups associated with the reviewer. In step 512, the method 500 unlocks the reviewer's markup data.

In some embodiments, the reviewer may review the reviewing file using one or more proprietary or purpose-built programs. In other embodiments, as described in more detail below with reference to FIG. 7, the reviewer may review the reviewing file using a commercially available word processing program or other program suitable for editing a document and associated markups.

Figure 6:
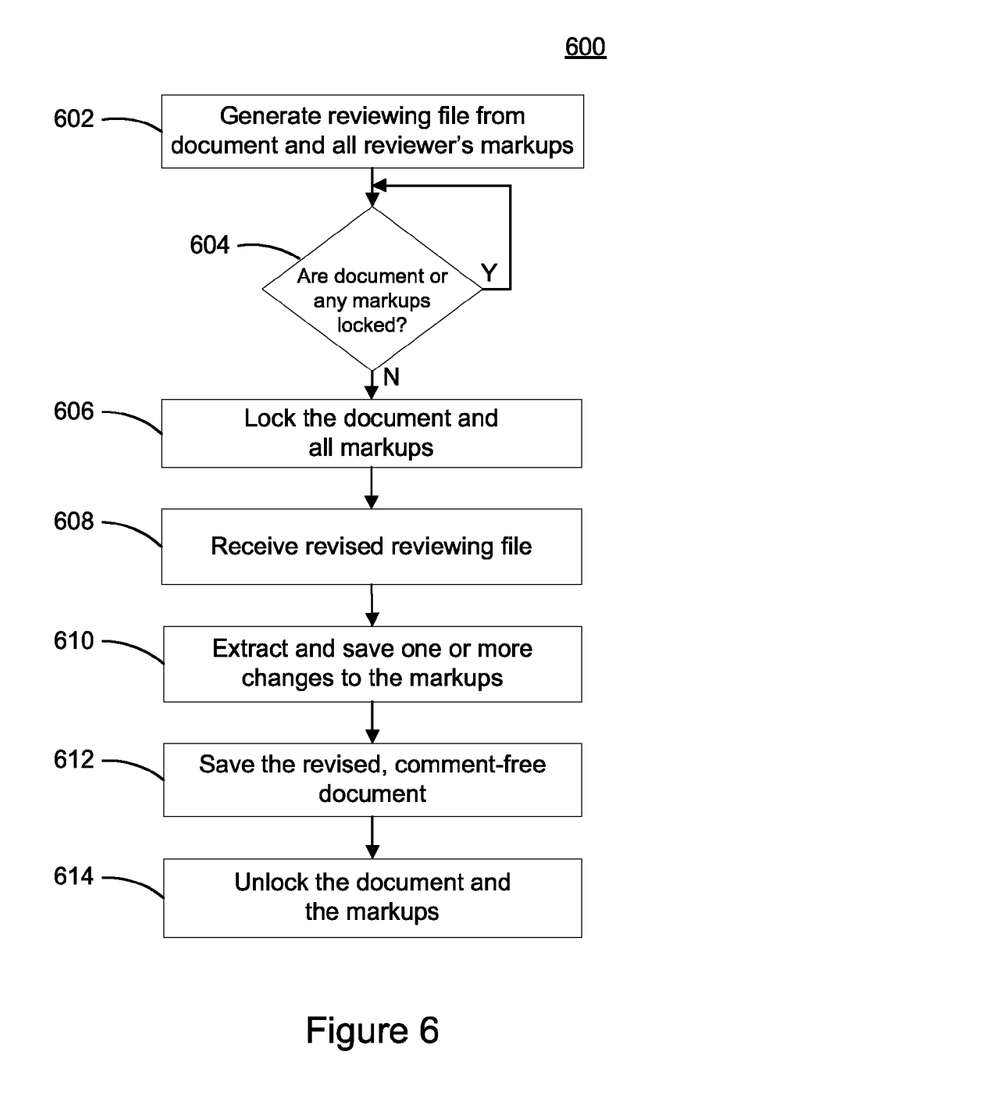

FIG. 6 depicts a method 600 of revising a document according to the disclosure. The method 600 provides one embodiment of the revising activity 206 described with reference to FIG. 2, as performed by the data processing system 100. In step 602, the data processing system 100 loads the markup data for all reviewers and generates a reviewing file by combining the comment-free, protected document 210 and the reviewers' markup data. The reviewing file may be sent to the user (or author) on the client system 150 or may be saved on the server 140 for the user to access.

In step 604, the method 600 checks the write lock of the document and the markup lock(s) of the markup store 214. Where the markups are stored in the format 402, the method 600 checks the write locks of all markup files 404. Where the markups are stored in the format 410, the method 600 checks the write lock 412 and the markup lock 414. If an author has locked the document and markups, or if any reviewer has locked her markup data, it is an indication that the document and/or the markup data cannot presently be modified and the method 600 loops, continuing to check the document write lock and the write/markup lock(s) until all are unlocked. While the document write lock and/or the write/markup lock(s) are locked, the author may use the marked up document in a read-only mode, or may terminate the revising activity 206 until a later time when the document write lock and the write/markup lock(s) are no longer locked. In this way, a user other than the user who locked the document and the markup data lock(s) is prevented from writing to the document or the markup data associated with any user.

If document write lock and the write/markup lock(s) of the markup store 214 are unlocked, in step 606, the method 600 locks the write lock of the document and the write lock(s) of all reviewers in the markup store 214. If the document is stored in the format 310, the method 600 further locks the individual objects that make up the document. Together, the write lock of the document and the write lock(s) of all reviewers in the markup store 214 collectively form a lock associated with the document and the markups of all reviewers. The author may add material to the document, edit existing material, and/or delete material from the document. The author may make the changes in response to reviewers' markups or comments or for other reasons. The author may add markups or comments of his own, or he may edit or delete markups of other reviewers.

When the author has completed revising the document, he terminates the revising activity 206. In step 608, the revised reviewing file is received. In step 610, the method 600 extracts the reviewers' markups from the revised reviewing file and stores them in the markup store 214. Where changes have been made to the document, many markups may also change, because of changes to the relative positions of their markup references in the character stream(s) of the document. In some embodiments, only markups that have changed may be saved. In other embodiments, all markups may be saved, regardless of whether they have changed.

In step 612, the method 600 also generates the updated, comment-free document 212 (with markups removed) from the revised reviewing file and sends the document 212 to authors/reviewers or stores the document 212 in the shared storage facility available to the reviewing activity 204. It will be understood that the steps 610 and 612 may be performed in any order during the performance of the method 600. Together, steps 608 through 612 perform a step of updating the document and one or more markups associated with the reviewer. In step 614, the method 600 unlocks the write lock of the document 212 (as well as, for documents stored in the format 310, the write locks of any objects that make up the document) and the write lock(s) of all reviewers in the markup store 214.

It will be understood that the author may revise the reviewing file using one or more proprietary or purpose-built programs. In other embodiments, the author may revise the reviewing file using a commercially available word processing program or other program suitable for editing a document and associated markups.

Figure 7:
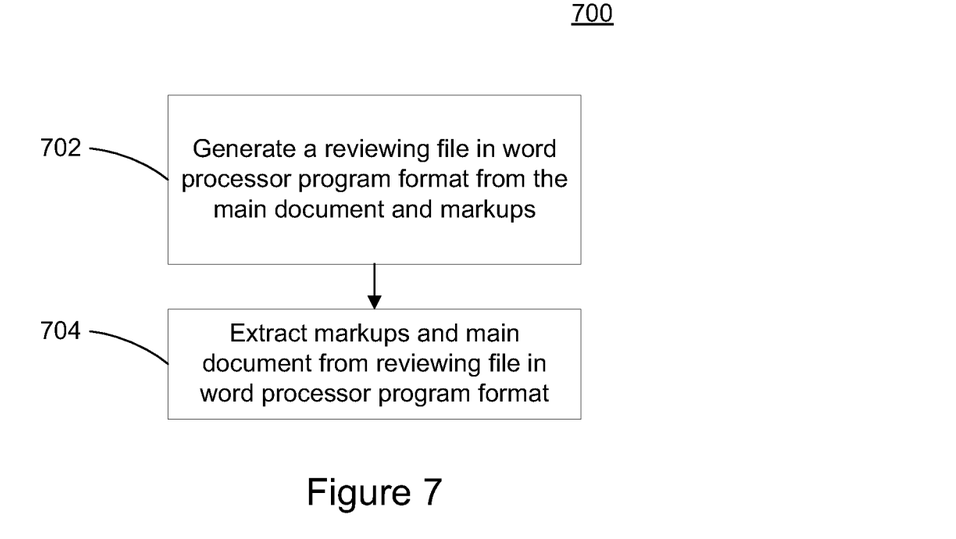

FIG. 7 depicts a method 700 of reviewing a document according to the disclosure. The method 700 presents an embodiment of some of the steps of the method 500 and/or the method 600. In step 702, the method 700 uses the comment-free, protected document 210 and the reviewers' markup data from the markup store 214 to generate a reviewing file in a format used by the Microsoft® Word® word processor or other program suitable for entering markups while reviewing a document. When the reviewer has completed reviewing the document, she terminates the word processor program and, in step 704, the method 700 extracts from the reviewing file in the word processor program format the markups associated with all reviewers, including the markups associated with the user, leaving the updated, comment-free document 212. Step 704 may be performed during step 510 of the method 500 or step 610 of the method 600. In this way, a word processor program or other program suitable for editing markups may be used to perform the reviewing activity 204 or the revising activity 206 according to the disclosure.

According to various embodiments, one or more of the processes or steps described in relation to FIGS. 5-7 may be performed alternately, concurrently, repeatedly, or in a different order, unless otherwise specifically described or claimed. "Receiving," as used herein, can include loading from storage, receiving from another data processing system such as over a network, receiving via an interaction with a user, a combination of these, or otherwise, as recognized by those of skill in the art.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for concurrent markup of a document by a plurality of reviewers, the method comprising:
   in a data processor system, combining a document and markups associated with a plurality of reviewers into a reviewing file for use by a first user of the data processing system;
   in the data processing system, locking a first lock, the first lock comprising a plurality of bits, each of the plurality of bits of the first lock associated with a corresponding single user, the first lock associated with a first plurality of markups, the first plurality of markups associated with the first user, wherein the first plurality of markups are locked if any of the plurality of bits are set, wherein the first lock is locked by setting an associated bit of the first user in the plurality of bits of the first lock and, while locked, prevents a user of the data processing system other than the first user from writing to the first plurality of markups;
   while the first lock is locked, updating in the data processing system a first markup associated with the first user; and
   unlocking in the data processing system the first lock,
   wherein updating a first markup associated with the first user includes, in the data processing system, receiving a revised reviewing file including a change to the first markup, extracting the change to the first markup from the revised reviewing file, and saving the changed first markup in the data processing system separate from the document.

2. The method of claim 1, further comprising:
   in the data processing system, locking a second lock, the second lock associated with the document and with a second plurality of markups, the second plurality of markups associated with all reviewers, wherein the second lock is locked by a second user of the data processing system and, while locked, prevents a user of the data processing system other than the second user from writing to the document or the second plurality of markups;
   while the second lock is locked, updating the document in the data processing system; and
   unlocking in the data processing system the second lock, wherein
   updating the document includes, in the data processing system, receiving a revised reviewing file including a change to the document and a change to a second markup, extracting all markups from the revised reviewing file to generate a comment-free revised document, saving the changed second markup in the data processing system separate from the comment-free revised document, and saving the comment-free revised document in the data processing system separate from the changed second markup,
   the steps of locking a first lock, updating a markup, and unlocking the first lock are performed only when the second lock is unlocked, and
   the steps of locking a second lock, updating the document, and unlocking the second lock are performed only when the first lock is unlocked.

3. The method of claim 1, wherein
   the markups associated with the plurality of reviewers are stored in the data processing system in a corresponding plurality of files, each file storing the markups associated with a single reviewer, and
   the first lock is associated with the file associated with the reviewer.

4. The method of claim 1, wherein combining a document and markups associated with the plurality of reviewers comprises generating the reviewing file in a markup format compatible with a word processor program.

5. The method of claim 1, wherein a markup includes a reference to a character in the document.

6. The method of claim 5, wherein the document is stored in the data processing system as a character stream, and the reference comprises an ordinal position of the character in the character stream.

7. The method of claim 5, wherein the document is generated from a plurality of objects, each object comprising an object identifier and a character stream, and the reference comprises an object identifier and an ordinal position of the character in the character stream of the identified object.

8. A data processing system comprising:

a processor; and accessible memory, wherein the data processing system is particularly configured to combine a document and markups associated with a plurality of reviewers into a reviewing file for use by a first user of the data processing system;

lock a first lock, the first lock comprising a plurality of bits, each of the plurality of bits of the first lock associated with a corresponding single user, the first lock associated with a first plurality of markups, the first plurality of markups associated with the first user, wherein the first plurality of markups are locked if any of the plurality of bits are set, wherein the first lock is locked by setting an associated bit of the first user in the plurality of bits of the first lock and, while locked, prevents a user of the data processing system other than the first user from writing to the first plurality of markups;

while the first lock is locked, update a first markup associated with the user; and unlock the first lock, wherein, to update the first markup associated with the first user, the data processing system is configured to receive a revised reviewing file including a change to the first markup, extract the change to the first markup from the revised reviewing file, and save the changed first markup separate from the document.

9. The data processing system of claim 8, wherein the data processing system is further configured to:

lock a second lock, the second lock associated with the document and with a second plurality of markups, the second plurality of markups associated with all reviewers, wherein the second lock is locked by a second user of the data processing system and, while locked, prevents a user of the data processing system other than the second user from writing to the document or the second plurality of markups;

update the document while the second lock is locked; and unlock the second lock, wherein to update the document, the data processing system is configured to receive a revised reviewing file including a change to the document and a change to a second markup, extract all markups from the revised reviewing file to generate a comment-free revised document, save the changed second markup separate from the comment-free revised document, and save the markup-free revised document, wherein the comment-free revised document is saved separate from the changed second markup, the data processing system is further configured to lock the first lock, update the markup, and unlock the first lock only when the second lock is unlocked, and the data processing system is further configured to lock a second lock, update the document, and unlock the second lock only when the first lock is unlocked.

10. The data processing system of claim 8, wherein the data processing system is further configured to store markups associated with the plurality of reviewers in a corresponding plurality of files, each file storing the markups associated with a single reviewer, wherein the first lock is associated with the file associated with the reviewer.

11. The data processing system of claim 8, wherein, to combine the document and the markups associated with the plurality of reviewers, the data processing system is configured to generate the reviewing file in a markup format compatible with a word processor program.

12. The data processing system of claim 8, wherein a markup includes a reference to a character in the document.

13. The data processing system of claim 12, wherein the data processing system is further configured to store the document as a character stream, wherein the reference comprises an ordinal position of the character in the character stream.

14. The data processing system of claim 12, wherein the data processing system is further configured to generate the document from a plurality of objects, each object comprising an object identifier and a character stream, wherein the reference comprises an object identifier and an ordinal position of the character in the character stream of the identified object.

15. A non-transitory computer-readable storage medium encoded with computer-executable instructions that, when executed, cause a data processing system to perform the steps of:

combining a document and markups associated with a plurality of reviewers into a reviewing file for use by a first user of the data processing system;

locking a first lock, the first lock comprising a plurality of bits, each of the plurality of bits of the first lock associated with a corresponding single user, the first lock associated with a first plurality of markups, the first plurality of markups associated with the first user, wherein the first plurality of markups are locked if any of the plurality of bits are set, wherein the first lock is locked by setting an associated bit of the first user in the plurality of bits of the first lock and, while locked, prevents a user of the data processing system other than the first user from writing to the first plurality of markups;

while the first lock is locked, updating a first markup associated with the user; and unlocking the first lock, wherein updating a first markup associated with the user includes, in the data processing system, receiving a revised reviewing file including a change to the first markup, extracting the change to the first markup from the revised reviewing file, and saving the changed first markup in the data processing system separate from the document.

16. The computer-readable storage medium of claim 15, further encoded with computer-executable instructions that, when executed, cause a data processing system to perform the steps of:

locking a second lock, the second lock associated with the document and with a second plurality of markups, the second plurality of markups associated with all reviewers, wherein the second lock is locked by a second user of the data processing system and, while locked, prevents a user of the data processing system other than the second user from writing to the document or the second plurality of markups;

while the second lock is locked, updating the document; and unlocking the second lock, wherein updating the document includes receiving a revised reviewing file including a change to the document and a change to a second markup, extracting all markups from the revised reviewing file to generate a comment-free revised document, saving the changed second markup separate from the comment-free revised document, and saving the comment-free revised document separate from the changed second markup, the steps of locking a first lock, updating a markup, and unlocking the first lock are performed only when the second lock is unlocked, and the steps of locking a second lock, updating the document, and unlocking the second lock are performed only when the first lock is unlocked.

17. The computer-readable storage medium of claim 15, further encoded with computer-executable instructions that, when executed, cause a data processing system to perform the steps of:

storing markups associated with the plurality of reviewers in a corresponding plurality of files, each file storing the markups associated with a single reviewer; and the first lock is associated with the file associated with the reviewer.

18. The computer-readable storage medium of claim 15, further encoded with computer-executable instructions that, when executed, cause a data processing system to perform the step of combining a document and markups associated with the plurality of reviewers comprises generating the reviewing file in a markup format compatible with a word processor program.

19. The computer-readable storage medium of claim 15, wherein a markup includes a reference to a character in the document.

20. The computer-readable storage medium of claim 19, further encoded with computer-executable instructions that, when executed, cause a data processing system to perform the step of storing the document as a character stream, wherein the reference comprises an ordinal position of the character in the character stream.

21. The computer-readable storage medium of claim 19, further encoded with computer-executable instructions that, when executed, cause a data processing system to perform the step of generating the document from a plurality of objects, each object comprising an object identifier and a character stream, wherein the reference comprises an object identifier and an ordinal position of the character in the character stream of the identified object.

\* \* \* \* \*

UNITED STATES PATENT AND TRADEMARK OFFICE
CERTIFICATE OF CORRECTION

PATENT NO. : 8,707,187 B2  Page 1 of 1
APPLICATION NO. : 12/883779
DATED : April 22, 2014
INVENTOR(S) : Jerry J. Zhou

It is certified that error appears in the above-identified patent and that said Letters Patent is hereby corrected as shown below:

On the Title Page, item [73]:

The Assignee should read

-- Siemens Product Lifecycle Management Software Inc., Plano, TX (US) --

Signed and Sealed this
Twenty-ninth Day of July, 2014

Michelle K. Lee
*Deputy Director of the United States Patent and Trademark Office*